(12) United States Patent
Lee et al.

(10) Patent No.: US 8,808,924 B2
(45) Date of Patent: Aug. 19, 2014

(54) ELECTROLYTE COMPRISING EUTECTIC MIXTURE AND SECONDARY BATTERY USING THE SAME

(75) Inventors: Byoung-Bae Lee, Cheonan-si (KR); Shin-Jung Choi, Iksan-si (KR); Jae-Seung Oh, Seoul (KR); Ji-Won Park, Daejeon (KR); Young-Kyu Han, Daejeon (KR); Jae-Hoon Jung, Daejeon (KR); Jae-Duk Park, Daejeon (KR)

(73) Assignee: LG Chem, Ltd. (KR)

( * ) Notice: Subject to any disclaimer, the term of this patent is extended or adjusted under 35 U.S.C. 154(b) by 1117 days.

(21) Appl. No.: 12/523,092

(22) PCT Filed: Jan. 16, 2008

(86) PCT No.: PCT/KR2008/000272
§ 371 (c)(1),
(2), (4) Date: May 19, 2010

(87) PCT Pub. No.: WO2008/088167
PCT Pub. Date: Jul. 24, 2008

(65) Prior Publication Data
US 2010/0239917 A1     Sep. 23, 2010

(30) Foreign Application Priority Data
Jan. 16, 2007  (KR) .................. 10-2007-0004913

(51) Int. Cl.
*H01M 10/0566*  (2010.01)
(52) U.S. Cl.
USPC ........................................................ 429/303
(58) Field of Classification Search
None
See application file for complete search history.

(56) References Cited

U.S. PATENT DOCUMENTS

| | | | | |
|---|---|---|---|---|
| 5,385,794 A | * | 1/1995 | Yokoyama et al. | 429/334 |
| 5,626,981 A | * | 5/1997 | Simon et al. | 429/105 |
| 2003/0118914 A1 | | 6/2003 | Mori | |
| 2003/0162098 A1 | * | 8/2003 | Gan et al. | 429/330 |
| 2004/0033421 A1 | * | 2/2004 | Ujiie et al. | 429/247 |
| 2006/0216612 A1 | * | 9/2006 | Jambunathan et al. | 429/326 |
| 2007/0099090 A1 | * | 5/2007 | Oh et al. | 429/339 |

FOREIGN PATENT DOCUMENTS

| | | |
|---|---|---|
| JP | 8-045545 A | 2/1996 |
| JP | 11-067265 A | 3/1999 |
| JP | 2002-110225 A | 4/2002 |
| JP | 2003-203673 A | 7/2003 |

(Continued)

OTHER PUBLICATIONS

International Search Report, PCT/KR2008/000272, dated Apr. 14, 2008.

(Continued)

*Primary Examiner* — Patrick Ryan
*Assistant Examiner* — Wyatt McConnell
(74) *Attorney, Agent, or Firm* — Lerner, David, Littenberg, Krumholz & Mentlik, LLP

(57) ABSTRACT

Disclosed is an electrolyte for a secondary battery, comprising an eutectic mixture consisting of: (a) am amide group-containing compound with at least one EDG introduced into the N-position thereof; and (b) an ionizable lithium salt. Also, provided are a secondary battery comprising such an electrolyte, and a method of adjusting an electrochemical stability window of an eutectic mixture consisting of an amide group-containing compound and a lithium salt by regulating electron donating properties of at least one substituent group introduced into the N-position of the amide group-containing compound.

16 Claims, 3 Drawing Sheets

(1) Cathode, (2) Anode, (3) Separator and Electrolyte, (4) Spacer
(5) Coin can casing, (6) Coin can lid, (7) Rubber sealant

(56) References Cited

FOREIGN PATENT DOCUMENTS

| | | | |
|---|---|---|---|
| JP | 2004014300 A | | 1/2004 |
| KR | 20000002445 A | | 1/2000 |
| KR | 1020000002445 | * | 1/2000 |
| KR | 20060005132 A | | 1/2006 |
| KR | 20060048262 A | | 5/2006 |
| KR | 20060051332 A | | 5/2006 |
| KR | 20080057604 A | | 6/2008 |

OTHER PUBLICATIONS

Office Action from corresponding Chinese Patent Application No. 200780035053.5 (claiming priority from Korean Patent Application No. 10-2007-0004913) on Sep. 14, 2010.

Notice of Allowance issued for the corresponding Korean Patent Application No. 10-2008-0003063 (claiming priority from Korean Patent Application No. 10-2007-0004913) on Aug. 10, 2010.

* cited by examiner (1) Cathode, (2) Anode, (3) Separator and Electrolyte, (4) Spacer
(5) Coin can casing, (6) Coin can lid, (7) Rubber sealant

ELECTROLYTE COMPRISING EUTECTIC MIXTURE AND SECONDARY BATTERY USING THE SAME

CROSS REFERENCE TO RELATED APPLICATIONS

The present application is a national phase entry under 35 U.S.C. §371 of International Application No. PCT/KR2008/000272, filed Jan. 16, 2008, which claims the benefit of Korean Patent Application No. 10-2007-0004913, filed Jan. 16, 2007. The disclosures of said applications are incorporated by reference herein.

TECHNICAL FIELD

The present invention relates to an electrolyte for a secondary battery, which ensures the safety of the battery and simultaneously has improved reduction stability.

BACKGROUND ART

In recent years, an increasing interest has been devoted to energy storage technology. As the energy storage technology is applied to mobile phones, notebooks, personal computers, etc., and further extends its application to electric vehicles, research and development on energy storage is becoming more and more specialized. In view of this, electrochemical devices attract public attention, and among others, a major attention is focused on chargeable/dischargeable secondary batteries.

Among secondary batteries that are now in use, a lithium ion secondary battery developed in the early 1990s is in the spotlight because of its advantage of providing a higher drive voltage and a far greater energy density than those of conventional batteries, such as Ni-MH, Ni—Cd and sulfuric acid-lead batteries.

In general, such a lithium ion secondary battery includes cathode and anode capable of lithium ion insertion/emission, and an electrolyte transferring lithium ions between the cathode and the anode. With regard to this, a non-aqueous electrolyte solution containing an electrolyte salt dissolved in an organic solvent is used as the electrolyte.

However, the organic solvent contained in the electrolyte is highly volatile and flammable, and thus may cause a safety problem under overcharge, overdischarge, and high temperature conditions when applied to a lithium ion secondary battery.

To solve this problem, Japanese Patent Publication No. 2002-110225 discloses an imidazolium-based ionic liquid and an ammonium-based ionic liquid for use in a lithium ion secondary battery. However, such ionic liquids are problematic in that they are reduced at a voltage higher than the redox potential of a lithium ion in an anode, or imidazolium and ammonium cations may be intercalated into an anode along with lithium ions. Further, as a result of actually using the imidazolium-based ionic liquid or the ammonium-based ionic liquid alone as a liquid electrolyte for a lithium secondary battery, the ionic liquid was not suitable to be practically applied to a secondary battery due to a significant drop in the capacity of the secondary battery during repeated charge/discharge cycles. And, the ionic liquid is expensive and complicated to produce and filter.

Therefore, various attempts are currently being made to ensure the safety of a secondary battery by improving existing electrodes or electrolyte components, or developing novel electrode active materials or electrolytes.

DISCLOSURE OF INVENTION

Technical Problem

Therefore, the present invention has been made to solve at least the above-mentioned problems. The present inventors have found that when an eutectic mixture consisting of (a) an amide group-containing compound with at least one electron donating group (EDG) introduced into its N-position; and (b) an ionizable lithium salt is used as a component of an electrolyte for a secondary battery, not only the safety of the battery can be ensured by the inherent properties of the eutectic mixture, including good thermal stability, good chemical stability, and high flame retardancy, but also the reduction stability of the electrolyte itself can be improved because the at least one EDG introduced into the N-position of the amide group-containing compound lowers the reduction potential of the eutectic mixture.

Based on such finding, the present invention provides an electrolyte for a secondary battery, which has superior reduction stability, and can ensure the safety of the secondary battery.

Technical Solution

In accordance with an aspect of the present invention, there is provided an electrolyte for a secondary battery, comprising an eutectic mixture consisting of: (a) an amide group-containing compound with at least one electron donating group (EDG) introduced into the N-position thereof; and (b) an ionizable lithium salt, and a secondary battery comprising such an electrolyte.

In accordance with another aspect of the present invention, there is provided a method of adjusting an electrochemical stability window of an eutectic mixture consisting of an amide group-containing compound and a lithium salt by regulating electron donating properties of at least one substituent group introduced into the N-position of the amide group-containing compound.

Hereinafter, the present invention will be described in detail.

Another conventional way to solve the safety problem caused by use of an organic solvent in a secondary battery is by using an eutectic mixture as a component of an electrolyte.

In general, an eutectic mixture refers to a mixture containing two or more substances and thereby having a decreased melting point, and particularly a mixed salt present in a liquid phase at room temperature. With regard to this, the room temperature generally means a temperature of up to 100° C., but in some cases, means a temperature of up to 60° C.

The eutectic mixture not only can replace existing noxious organic solvents by virtue of having a broad electrochemical stability window, a broad range of temperatures where it exists as a liquid, high solvation capability, non-coordinate bonding capability, etc., but also does not cause a problem of electrolyte evaporation and exhaustion because of having little vapor pressure as compared to the existing solvents. Further, the eutectic mixture is flame-retardant, and thus can advantageously enhance the safety of a battery.

However, the eutectic mixture has a problem in that the scope of anodes usable in combination therewith is limited due to its electrochemical stability window covering a range of about 0.5 to 5.5V.

The electrochemical stability window is one of electrochemical stability indexes, and generally refers in batteries to a range, the upper/lower limit of which is an oxidation/reduction potential measured in a half cell with respect to a lithium metal reference electrode. That is, while a substance of interest is electrochemically stable and thus difficult to oxidize/reduce within an electrochemical stability window, it may be easily oxidized/reduced and decomposed beyond the electrochemical stability window.

Therefore, when an anode with a reduction potential vs. lithium potential of 0.5V or less (e.g., a carbonaceous material, such as artificial graphite) is used in combination with an eutectic mixture, the eutectic mixture is reduced and decomposed in the anode, which results in lowering of battery performance.

On account of this, an eutectic mixture is usually used in combination with an anode with a reduction potential vs. lithium potential of 1V or greater (e.g., a metal such as lithium, or a metal oxide such as $Li_{4/3}Ti_{5/3}O_4$). However, in this case, a potential difference between the anode and a cathode is reduced, which makes it difficult to implement a high-voltage battery, and may cause a decrease in the energy density of a battery.

In addition, in order to prevent an eutectic mixture from being reduced and decomposed in an anode, a specific compound capable of forming a passivation film on the surface of the anode may be used as an electrolyte additive. However, not only the passivation film formed in this way is generally known to be insufficient for continually serving as a protection film for an electrode, but is also problematic in that it may cause a decrease in battery capacity or other harmful effects due to the use of the additive, and is uneconomical.

Accordingly, in using an eutectic mixture as a component of an electrolyte for a secondary battery, the first thing to consider is to ensure stability against the reduction of the eutectic mixture and thus an electrolyte itself.

Thereupon, the present invention is characterized by using an eutectic mixture consisting of an amide group-containing compound and a lithium salt as a component of an electrolyte for a secondary battery, and introducing at least one electron donating group (EDG) into the N-position of the amide group-containing compound, thereby further reducing the reduction potential of the eutectic mixture and thus intrinsically shifting the electrochemical stability window of the eutectic mixture to a lower limit.

The present inventors have discovered that the electron density of a nitrogen-carbon (N—C) bond is a major factor affecting the reduction potential of an amide group-containing compound, and the reduction potential of the amide group-containing compound lower by adjusting the electron donating property and the electron donating degree of a substituent introduced into the N-position and thus increasing the electron density of the N—C bond. With regard to this, the reduction potential is a relative value to a $Li^+/Li$ potential in a half cell.

More specially, through quantum chemical calculations, the present inventors have discovered that the substitution position and the number of EDGs have a great affection on the reduction potential of the amide group-containing compound.

That is, the lowest unoccupied molecular orbital (LUMO) value of an amide group-containing compound (ethylcarbamate) was calculated while the N-position and the O-position of the amide group-containing compound are substituted by at least one EDG, and the electron donating degree of the EDG or the number of the EDGs is changed. As a result of this, the extent of an increase in the LUMO value according to increasing the electron donating degree of the EDG was insignificant when O of the amide group-containing compound was substituted by the EDG. On the contrary, the extent of an increase in the LUMO value was considerable when N of the amide group-containing compound was substituted by the EDG. Further, the LUMO value showed a tendency to become larger with an increase in the number of EDGs substituted at the N-position. Since the larger the LUMO value, the lower a reduction potential in a half cell, it can be noted from this result that the reduction potential of an amide group-containing compound is lowered when an EDG is substituted at the N-position, and preferably as the number of EDGs substituted at the N-position increase.

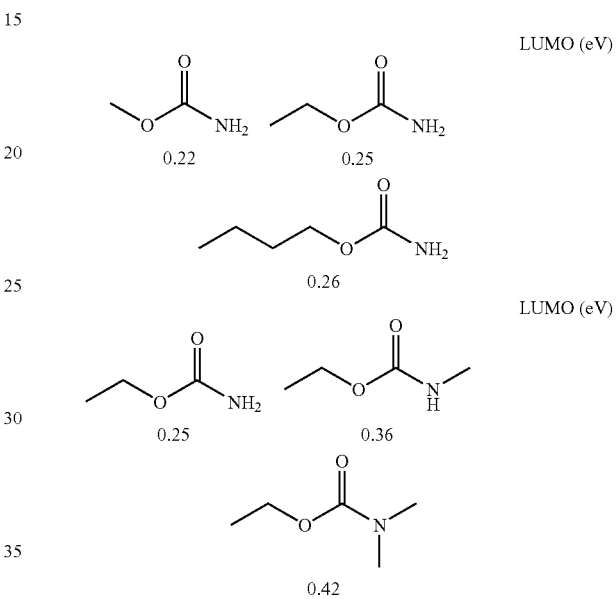

Therefore, in the present invention, the reduction potential of an eutectic mixture can be lowered, and thus the electrochemical stability window of the eutectic mixture can shift to a lower limit. In other words, the present invention can prevent the reduction decomposition of an eutectic mixture caused by a difference between potentials vs. lithium potential of the eutectic mixture and an anode, thereby improving the reduction stability of the eutectic mixture and thus an electrolyte itself.

One of components of an eutectic mixture according to the present invention is an amide group-containing compound with at least one EDG introduced into its N-position. Any EDG may be used without particular limitations, so long as it serves as an electron donor, and an atomic group with a Hammett substituent constant value less than 0 is preferably used as the EDG. In particular, the smaller the Hammett substituent constant value, the better the EDG. Non-limiting examples of the EDG include a C1~C20 alkyl group, an alkylamine group, a C2~C20 alkenyl group, an aryl group, and so forth.

The amide group-containing compound may have a linear structure and/or a cyclic structure. The amide group containing-compound of the present invention may be a compound represented by the following Formula 1 or 2, and non-limiting examples thereof include N-ethylacetamide, N-methylurea, N,N'-dimethylurea, ethyl N-methylcarbamate, ethyl N-ethylcarbamate, ethyl N,N-dimethylcarbamate, methyl N-methylcarbamate, methyl N,N-dimethylcarbamate, N-methylcaprolactam, phenyl N,N-dimethylcarbamate, methyl N-butylcarbamate, methyl N-phenylcarbamate, methyl N-ethylcarbamate, and N-ethyl-N-phenylethylcarbamate. Such examples may be used alone or in combination.

[Formula 1]

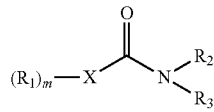

In Formula 1, at least one of $R_2$ and $R_3$ is an EDG, and the other is hydrogen or halogen; and X is selected from the group consisting of hydrogen (H), carbon (C), silicon (Si), oxygen (O), nitrogen (N), phosphorous (P), and sulfur (S), with the proviso that i) when X=H, m=0, ii) when X=O or S, m=1, iii) when X=N or P, m=2, and iv) when X=C or Si, m=3, for each of which $R_1$ is independently selected from the group consisting of hydrogen, halogen, a C1~C20 alkyl group, an alkylamine group, an alkenyl group, and an aryl group.

[Formula 2]

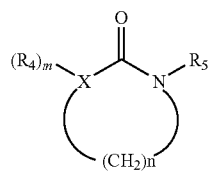

In Formula 2, $R_5$ is an EDG; X is selected from the group consisting of carbon (C), silicon (Si), oxygen (O), nitrogen (N), phosphorous (P), and sulfur (S), with the proviso that i) when X=O or S, m=0, ii) when X=N or P, m=1, and iii) when X=C or Si, m=2, for each of which $R_4$ is independently selected from the group consisting of hydrogen, halogen, a C1~C20 alkyl group, an alkylamine group, an alkenyl group, and an aryl group; and n is an integer of 1 to 10.

An ionizable lithium salt is used as another component of the eutectic mixture of the present invention. In this way, since an electrolyte itself comprising the eutectic mixture contains a lithium salt, there is an advantage in that a further lithium salt need not be added even in the case of a lithium secondary battery which requires intercalation/deintercalation of lithium ions into/from both electrodes (a cathode and an anode) active material. Further, since a lithium ion ($Li^+$) is the only cation present in the electrolyte, dissimilar to a conventional ionic liquid electrolyte, there is no fear that other cations hinders lithium ion intercalation into an anode, which leads to an improvement in battery performance.

The lithium salt is a salt with a structure represented by $Li^+Y^-$, and there is no particular limitation on anion $Y^-$ of the lithium salt, so long as it can form a salt with lithium. Non-limiting examples of such an anion include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like.

When the eutectic mixture of the present invention is applied to an electrolyte for a secondary battery, the molar ratio of the amide group-containing compound to the lithium salt preferably ranges from 1:1 to 8:1, and particularly from 2:1 to 6:1.

Although there is no particular limitation on the melting point of the eutectic mixture of the present invention, it is preferred that the eutectic mixture is in a liquid phase at a temperature of 100° C. or less, and preferably at room temperature (60° C. or less). Also, the viscosity of the eutectic mixture of the present invention is not particularly limited, but is preferably equal to or less than 100 cP.

The eutectic mixture may be prepared by means of a conventional method well known in the art. As an example, the eutectic mixture may be prepared by mixing an amide group-containing compound with a lithium salt, and then allowing the resultant mixture to react at room temperature or a temperature of 50 to 70° C. In the process of preparation, the bond between a cation and an anion of the ionizable lithium salt weakens due to the carbonyl group (C=O) and the amine group (—$NH_2$) present in the amide group-containing compound, and the amide group-containing compound and the lithium salt, which were originally present in a solid phase, exhibit a melting point drop, as a result of which an eutectic mixture present in a liquid phase at room temperature can be formed.

Besides the eutectic mixture, the electrolyte for a secondary battery according to the present invention may further comprise: (a) a first compound capable of being reduced at a potential higher than the reduction potential vs. lithium potential ($Li/Li^+$) of the eutectic mixture to thereby form a passivation film on the surface of an anode, (b) a second compound having an oxidation potential higher than a cathode potential and thus consuming overcharge current, or (c) both the first and second compounds.

There is no particular limitation on the first compound, so long as it is reduced at a potential higher than the reduction potential vs. lithium potential ($Li/Li^+$) of the eutectic mixture to thereby form a passivation film on the surface of an anode and thus to prevent side reactions between the anode and the electrolyte, thusly improving battery performance. Non-limiting examples of the first compound include 12-crown-4, 18-crown-6, catechol carbonate, vinylene carbonate, ethylene sulfite, 1,3-propane sultone, methylchloroformate, succinimide, methylcinnamate, N-acetyl lactam, and so forth.

Also, there is no particular limitation on the second compound, so long as it has an oxidation potential higher than a cathode potential, and thus consumes overcharge current, thereby improving the safety of the battery through prevention of battery explosion and/or ignition resulting from overcharge. Non-limiting examples of the second compound include biphenyl family, benzene family such as halobenzene, cyclohexylbenzene and xylene, and the like.

<Type of Application of Inventive Electrolyte for Secondary Battery>

The electrolyte for a secondary battery according to the present invention is not particularly limited to any specific type of application, but may be of two types, i.e., a liquid electrolyte type and a gel polymer electrolyte type.

(1) Since the aforementioned eutectic mixture is in a liquid phase at room temperature, the eutectic mixture itself may be used as a liquid electrolyte for a secondary battery.

(2) Also, the gel polymer electrolyte type refers to a gel polymer electrolyte comprising the eutectic mixture, and may be prepared by polymerizing monomers in the presence of the eutectic mixture, or impregnating an already prepared polymer or gel polymer with the eutectic mixture.

① First of all, reference will now be made to a gel polymer electrolyte prepared by polymerization of monomers.

The gel polymer electrolyte may be formed by polymerizing an electrolyte precursor solution containing: (i) an eutectic mixture comprising an amide group-containing compound and a lithium salt; and (ii) monomers capable of forming a gel polymer via polymerization.

There is no limitation on the kind of monomer as long as it is capable of forming a gel polymer by polymerization, and particular examples of such monomers include vinyl monomers, etc. Vinyl monomers have advantages in that they can provide transparent polymerization products when mixed with an eutectic mixture and are amenable to simple polymerization conditions.

Non-limiting examples of the vinyl monomer that may be used according to the present invention include acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, vinyl chloride, methyl vinyl ketone, ethylene, styrene, para-methoxystyrene, para-cyanostyrene, etc. Preferably, the monomer capable of forming a gel polymer by polymerization provides low volumetric shrinkage upon polymerization and permits in-situ polymerization inside of an electrochemical device.

The electrolyte precursor solution may further comprise a polymerization initiator or a photoinitiator.

Initiators are decomposed by heat or UV rays to form radicals, and then react with a monomer through free radical polymerization to form a gel polymer electrolyte. It is also possible to carry out polymerization of monomers without using any initiator. Generally, free radical polymerization includes an initiation step in which transient molecules or active points having strong reactivity are formed; a propagation step in which a monomer is added to the end of an active chain to form another active point at the end of the chain; a chain transfer step in which active points are transferred to other molecules; and a termination step in which the center of an active chain is broken.

Thermal initiators that may be used in the polymerization include organic peroxides or hydroperoxides such as benzoyl peroxide, acetyl peroxide, dilauryl peroxide, di-tert-butyl peroxide, cumyl hydroperoxide, hydrogen peroxide, etc., and azo compounds such as 2,2-azobis(2-cyanobutane), 2,2-azobis(methylbutyronitrile), AIBN (azobis(iso-butyronitrile), AMVN (azobisdimethyl-valeronitrile), organometallic compounds such as alkylated silver compounds, etc. Additionally, non-limiting examples of the photoinitiator that permits formation of radicals by the light such as UV rays include chloroacetophenone, diethoxy acetophenone (DEAP), 1-phenyl-2-hydroxy-2-methyl propaneone (HMPP), 1-hydroxycyclohexyl phenyl ketone, α-aminoacetophenone, benzoin ether, benzyl dimethyl ketal, benzophenone, thioxanthone, 2-ethylanthraquinone (2-ETAQ), etc.

Additionally, the mixing ratio in the electrolyte precursor solution according to the present invention on the weight basis, i.e., the weight ratio of (eutectic mixture) x:(monomer capable of forming a gel polymer by polymerization) y:(polymerization initiator) z, is 0.5~0.95:0.05~0.5:0.00~0.05, with the proviso that x+y+z=1. More preferably, x is 0.7~0.95, y is 0.05~0.3 and z is 0.00~0.01.

In addition to the above-mentioned components, the electrolyte precursor solution optionally further contain other additives well known in the art.

In this way, a gel polymer electrolyte can be formed using the electrolyte precursor solution according to a common method well known in the art. As an example, the gel polymer electrolyte may be formed by in-situ polymerization inside of a battery. The in-situ polymerization may be initiated by irradiation of heat or UV rays. With regard to this, the degree of formation of the gel polymer electrolyte is preferably such that leakage of the gel polymer electrolyte does not occur and the electrolyte is not over-polymerized to the extent of causing volumetric shrinkage, which can be controlled by polymerization time, polymerization temperature, or the amount of irradiation of light. For example, polymerization temperature may be in a range of 40 to 80° C., and polymerization time is preferably in a range of 20 to 60 minutes although it may vary according to the type of an initiator and polymerization temperature.

② According to another preferred embodiment of the present invention, an already prepared polymer or gel polymer is impregnated with the eutectic mixture.

Non-limiting examples of the polymer that may be used in the present invention include polymethyl methacrylate, polyvinylidene difluoride, polyvinyl chloride, polyethylene oxide, polyhydroxyethyl methacrylate, etc. Any gel polymers known to one skilled in the art may also be used.

③ According to still another preferred embodiment of the present invention, a polymer and the eutectic mixture are dissolved in a solvent and then the solvent is removed to form a gel polymer electrolyte. Herein, the eutectic mixture is included in the polymer matrix.

Although there is no particular limitation on selecting the solvent, and an organic solvent currently used in a battery may be used. Non-limiting examples of the solvent include toluene, acetone, acetonitrile, tetrahydrofuran (THF), propylene carbonate (PC), ethylene carbonate (EC), diethyl carbonate (DEC), dimethyl carbonate (DMC), dipropyl carbonate (DPC), dimethyl sulfoxide, dimethoxyethane, diethoxyethane, N-methyl-2-pyrrolidone (NMP), ethyl methyl carbonate (EMC), gamma-butyrolactone (GBL) or a mixture thereof. Such organic solvents may deteriorate the safety of a secondary battery due to their inflammability. Thus, it is preferable to use such organic solvents in a small amount. Additionally, phosphates may be used as a flame retardant currently used for a lithium secondary battery, and non-limiting examples thereof include trimethyl phosphate, triethyl phosphate, ethyl dimethyl phosphate, tripropyl phosphate, tributyl phosphate, or a mixture thereof.

Additionally, there is no particular limitation on the method for removing the solvent and any conventional heating methods may be used.

A secondary battery according to the present invention may comprise: a cathode; an anode; a separator; and an electrolyte, wherein the electrolyte comprises the above-mentioned electrolyte for a secondary battery.

The secondary batteries are lithium secondary batteries and non-limiting examples of the lithium secondary battery include lithium metal secondary batteries, lithium ion secondary batteries, lithium polymer secondary batteries or lithium ion polymer batteries.

The secondary battery may include a high-voltage battery with a charge voltage of 4.35V, as well as a common battery, the charge/discharge region of which ranges from 0V to 4.2V.

The secondary battery may be manufactured by using a method generally known to those skilled in the art. According to one embodiment of the method, both electrodes (a cathode and an anode) are stacked with a separator interposed between both electrodes to form an electrode assembly, and then the eutectic mixture-containing electrolyte is injected thereto.

An electrode to be applied to the secondary battery of the present invention is not particularly limited, and may be prepared by a conventional method well known in the art. For example, electrode slurry is prepared by mixing and agitating an electrode active material and a solvent optionally with a binder, a conductive agent and a dispersant, and then the slurry is applied (coated) onto a metallic current collector, followed by compressing and drying.

A cathode active material or an anode active material may be used as the electrode active material.

The anode active material is a material capable of lithium insertion/emission, and any type of anode active material may be used so long as it is well known in the art. In the present invention, it is possible to use not only an anode active material with a reduction potential vs. lithium potential of 1V or greater, but also an anode active material with a reduction potential vs. lithium potential of 0 to 1V, in particular, 0 to 0.5V. The anode active material may be a carbonaceous material, a metal, a metal oxide, a metalloid, or a metalloid-containing alloy. The carbonaceous material may be a high crystalline or low crystalline carbonaceous material, and non-limiting examples thereof include carbon, petroleum coke, activated carbon, graphite, or other carbon family. Also, the metal oxide may be a oxide with a spinel-like structure, and non-limiting examples thereof include $WO_3$, $MoO_3$, $LiCr_3O_8$, $LiV_3O_8$, $TiS_2$, $Li_{4/3}Ti_{5/3}O_4$, a mixture thereof, and the like.

Particularly, cathode active materials may include any conventional cathode active materials currently used in a cathode of a conventional secondary battery. Particular non-limiting examples of the cathode active material include: lithium transition metal composite oxides, including $LiM_xO_y$ (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium disulfide, molybdenum disulfide, etc.); or the like. Among these examples, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (wherein $0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $LiCoPO_4$, $LiFePO_4$ or a mixture thereof is particularly preferred. Non-limiting examples of a cathode current collector include foil formed of aluminum, nickel or a combination thereof.

The separator that may be used in the present invention includes a porous separator that serves to interrupt an internal short circuit between both electrodes and is impregnated with an electrolyte. Non-limiting examples of the separator include a polypropylene-based, polyethylene-based or polyolefin-based separator, or a composite porous separator comprising inorganic materials incorporated into the porous separator.

In addition to the above constitutional elements, the secondary battery may further comprise conductive elastic materials for filling the remaining space of the secondary battery.

There is no particular limitation on the outer shape of the lithium secondary battery obtained in the above-described manner. The lithium secondary battery may be a cylindrical battery using a can, a prismatic battery, or a pouch-type battery.

Additionally, the present invention provides a method of adjusting the electrochemical window of an eutectic mixture consisting of an amide group-containing compound and a lithium salt by regulating the electron donating properties of at least one substituent group introduced into the N-position of the amide group-containing compound. That is, the reduction potential of the amide group-containing compound is raised by substituting an electron withdrawing group (EWG) at the N-position of the amide group-containing compound and thus decreasing the electron density of a N—C bond; or the reduction potential of the amide group-containing compound is lowered by substituting an electron donating group (EDG) at the N-position of the amide group-containing compound and thus increasing the electron density of a N—C bond. In this way, the electrochemical stability window of the eutectic mixture can intrinsically shift to an upper/lower limit. Also, by regulating the electron donating degree of the substituent group, the electrochemical stability window of the eutectic mixture can be more precisely adjusted.

MODE FOR THE INVENTION

Reference will now be made in detail to the present invention by way of preferred embodiments and comparative examples. It is to be understood that the following examples are illustrative merely, and the present invention is not limited thereto.

Example 1

1-1. Preparation of Eutectic Mixture

An eutectic mixture (13 g) was obtained by mixing 7 g of ethyl N-methylcarbamate ($CH_3NHCOOC_2H_5$) and 6 g of $LiN(SO_2CF_3)_2$ in a molar ratio of 3:1 and then gradually stirring the resultant mixture at room temperature under a nitrogen atmosphere for 12 hours. Subsequently, moisture contained in the eutectic mixture was reduced to 20 ppm or less under a vacuum atmosphere of 0.3 torr.

1-2. Preparation of Secondary Battery

<Preparation of Cathode>

$LiCoO_2$ as a cathode active material, artificial graphite as a conductive material, and polyvinylidene fluoride as a binder were mixed in a weight ratio of 94:3:3, and N-methylpyrrolidone was added to the resultant mixture to thereby provide a slurry. The slurry was applied onto an aluminum foil, and then dried at 130° C. for 2 hours to thereby prepare a cathode.

<Preparation of Anode>

Graphite carbon as an anode active material, artificial graphite, and a binder were mixed in a weight ratio of 94:3:3, and N-methylpyrrolidone was added to the resultant mixture to thereby provide a slurry. The slurry was applied onto a copper foil, and then dried at 130° C. for 2 hours to thereby prepare an anode.

<Assembly of Secondary Battery>

Figure 1:
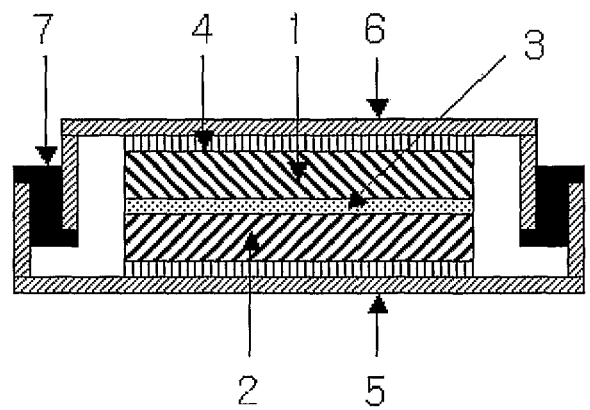
FIG. 1 is a sectional view showing the structure of a coin type secondary battery.

The cathode and the anode prepared as described above were provided, each in a size of 1 cm², a separator was inserted therebetween, and then an electrolyte consisting of 95 weight parts of the eutectic mixture obtained in step 1-1 and 5 weight parts of vinylene carbonate was injected into the resultant assembly to thereby complete a secondary battery as illustrated in FIG. 1.

Comparative Example 1

An eutectic mixture and a secondary battery with an electrolyte comprising the eutectic mixture were prepared in the same manner as in Example 1, except that 6 g of ethylcarbamate ($NH_2COOC_2H_5$) was used instead of 7 g of ethyl N-methylcarbamate ($CH_3NHCOOC_2H_5$).

Comparative Example 2

An eutectic mixture and a secondary battery with an electrolyte comprising the eutectic mixture were prepared in the same manner as in Example 1, except that 6 g of methylcarbamate ($NH_2COOCH_3$) was used instead of 7 g of ethyl N-methylcarbamate ($CH_3NHCOOC_2H_5$).

Comparative Example 3

An eutectic mixture and a secondary battery with an electrolyte comprising the eutectic mixture were prepared in the same manner as in Example 1, except that 14 g of methyl N-trifluoromethylcarbamate ($CF_3NHCOOCH_3$) was used instead of 7 g of ethyl N-methylcarbamate ($CH_3NHCOOC_2H_5$).

Experimental Example 1

Evaluation of Reduction Potential of Eutectic Mixtures

Figure 2:
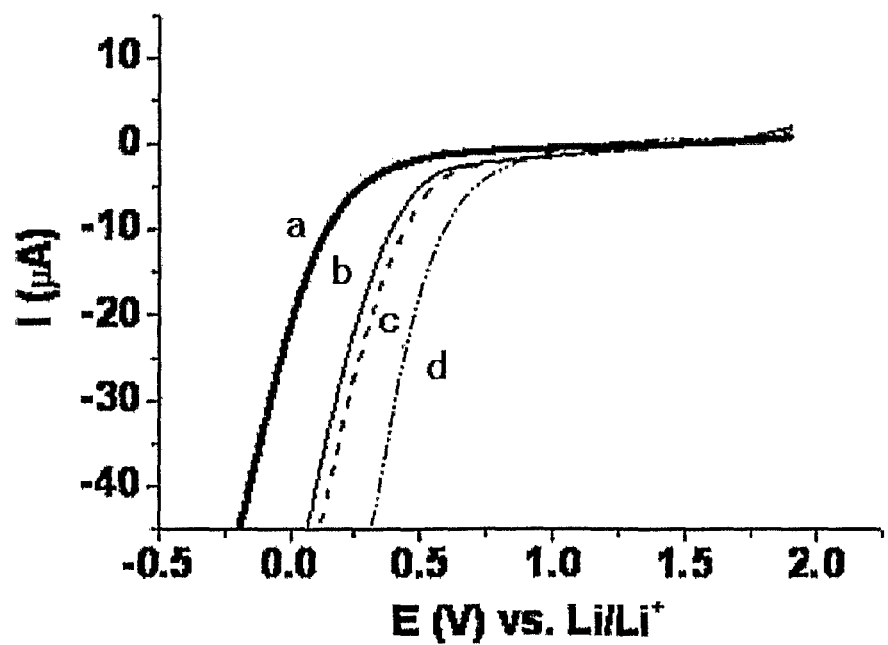
FIG. 2 is a graph showing the reduction potential of an eutectic mixture according to Example 1-1, and Comparative Examples 1 to 3, measured in Experimental Example 1, in which curve a designates Example 1, curve b designates Comparative Example 1, curve c designates Comparative Example 2, and curve d designates Comparative example 3.

An experiment was performed in which the reduction potentials of the eutectic mixtures obtained in Example 1-1 and Comparative Examples 1 to 3 were measured using cyclic voltammetry, and measurement results thereof were plotted in FIG. 2. In the experiment, glassy carbon was used as a working electrode, lithium metal was used as a reference electrode, and lithium metal is used as a counter electrode. Also, a scanning speed of 50 mV/s was used in the measurements.

As a result of the experiment, the eutectic mixture of Example 1-1 comprising N-methylcarbamate in which the ethyl group (EDG) was substituted at the N-position of the amide group exhibited a reduction potential of approximate 0.3V (see curve a in FIG. 2), and the eutectic mixtures of Comparative Examples 1 and 2, each comprising ethylcarbamate or methylcarbamate in which a substituent group was not introduced at the N-position of the amide group, exhibited a reduction potential of approximate 0.55V and 0.60V, respectively (see curves b and c in FIG. 2).

On the contrary, the eutectic mixture of Comparative Example 3 comprising N-trifluoromethylcarbamate ($CF_3NHCOOCH_3$) in which the trifluoromethyl group (EWG) was substituted at the N-position of the amide group exhibited a reduction potential of 0.8V, which was considerably higher than those of the eutectic mixtures of Comparative Examples 1 and 2 (see curve d in FIG. 2).

From this, it can be confirmed that the reduction potential of an eutectic mixture comprising an amide group-containing compound varies according to the electron donating property of a substituent group introduced into the N-position of the amide group-containing compound. In particular, it can be assured that an eutectic mixture comprising an amide group-containing compound with an EDG introduced into its N-position has a lower reduction potential than that of an eutectic mixture comprising an amide group-containing compound without any substituent introduced into its N-position or with an EWG introduced into its N-position.

Therefore, it can be noted that when an eutectic mixture comprising an amide group-containing compound with an EDG introduced into its N-position is used as a component of an electrolyte according the present invention, the electrochemical stability window of the electrolyte can shift to a lower limit.

Experimental Example 2

Performance Evaluation of Secondary Batteries

An experiment was performed in which each of the secondary batteries prepared in Example 1 and Comparative Examples 1 to 3 was charged/discharged at a rate of 0.5 C and its discharge capacity and charge/discharge efficiency according to a charge/discharge cycle were measured, and measurement results were plotted in FIGS. 3 to 6.

Figure 3:
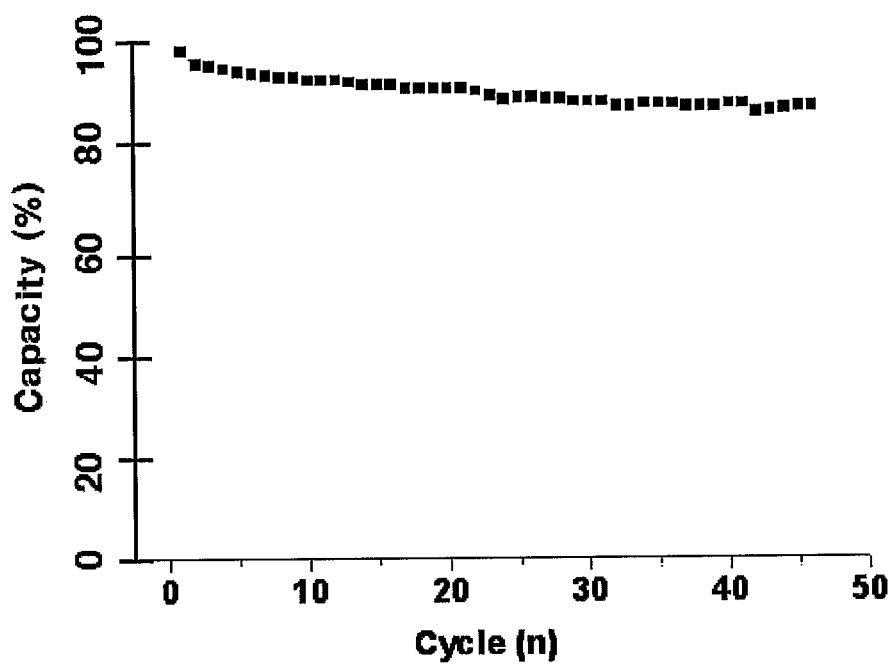
FIG. 3 is a graph showing the discharge capacity according cycles of a lithium secondary battery according to Example 1.

In Example 1-2 where the eutectic mixture comprising the amide group-containing compound with an EDG introduced into its N-position was used as an electrolyte component, the secondary battery exhibited a discharge capacity of 90% and a charge/discharge efficiency of 99.7% after 50 times of charge/discharge cycles (see FIG. 3).

Figure 4:
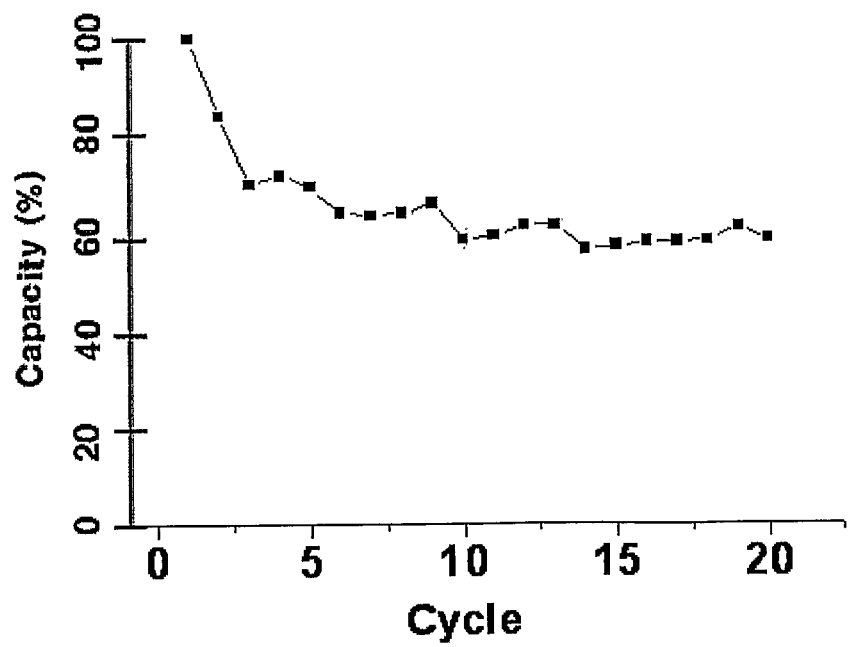
FIG. 4 is a graph showing the discharge capacity according cycles of a lithium secondary battery according to Comparative Example 1.
Figure 5:
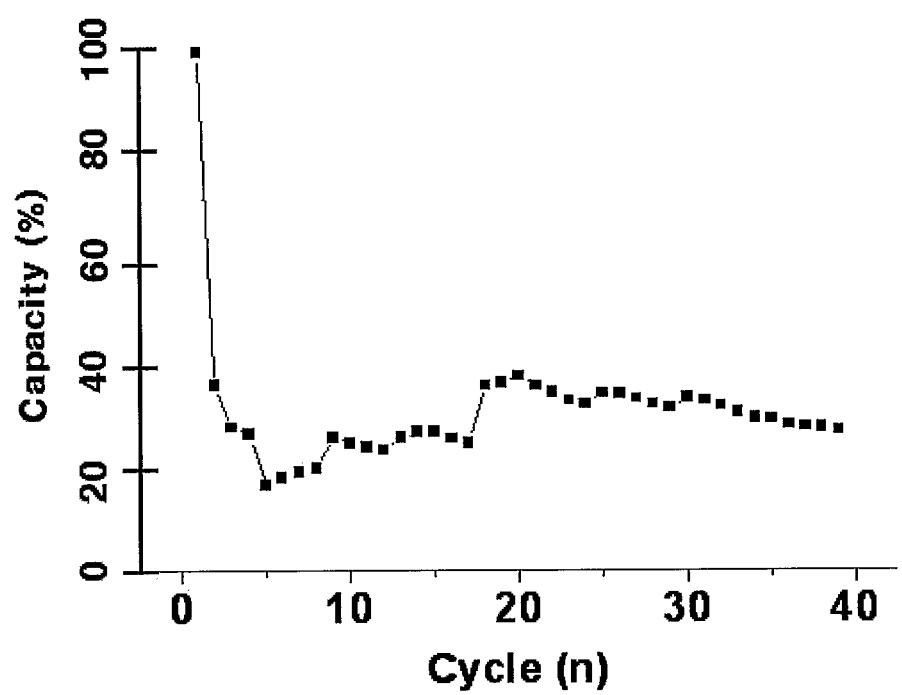
FIG. 5 is a graph showing the discharge capacity according cycles of a lithium secondary battery according to Comparative Example 2.
Figure 6:
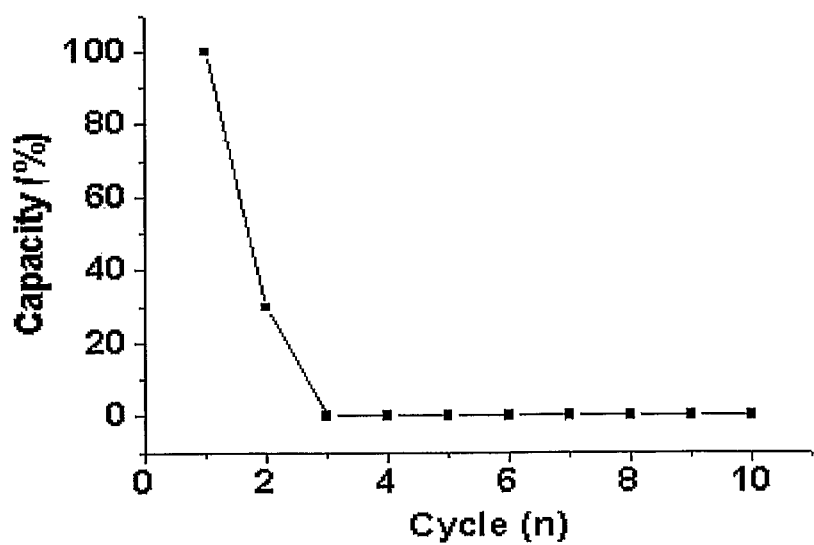
FIG. 6 is a graph showing the discharge capacity according cycles of a lithium secondary battery according to Comparative Example 3.

Contrarily, in Comparative Examples 1 and 2, in each of which the eutectic mixture comprising the amide group-containing compound without any substituent group introduced into its N-position was used as an electrolyte component, the secondary battery of Comparative Example 1 exhibited a discharge capacity of 60% or less and a charge/discharge efficiency of 95% after 20 times of charge/discharge cycles (see FIG. 4). Also, the secondary battery of Comparative Example 2 exhibited a discharge capacity of 40%, and its charge/discharge efficiency is not stable (see FIG. 5). Particularly, the secondary batteries of Comparative Examples 1 and 2 showed a result in which the discharge capacity rapidly decreased in the initial charge/discharge cycle.

In Comparative Example 3 where the eutectic mixture comprising N-trifluoromethylcarbamate ($CF_3NHCOOCH_3$) with trifluoromethyl (EWG) substituted at the N-position of the amide group was used as an electrolyte component, the secondary battery exhibited a discharge capacity of 0 after two times of charge/discharge cycles, and thus failed to function as a battery.

From this, it can be confirmed that when an eutectic mixture comprising an amide group-containing compound with an EDG introduced into its N-position is used as a component of an electrolyte, the reduction potential of the electrolyte itself is low enough to have better reduction stability.

Especially, while an electrolyte in which an eutectic mixture comprising an amide group-containing compound without any substituent group introduced into its N-position or with an EDG substituted at its N-position is used as an electrolyte component is difficult to use in combination with an anode with a reduction potential vs. lithium potential of 0.5V or less (e.g., artificial graphite), the inventive electrolyte in which an eutectic mixture comprising an amide group-containing compound with an EDG introduced into its N-position is used as an electrolyte component can be used in combination with an anode with a reduction potential vs. lithium potential of 0.5 V or less, and can be improved in life performance and charge/discharge efficiency.

Industrial Applicability

As can be seen from the foregoing, the inventive electrolyte for a secondary battery, in which an eutectic mixture comprising an amide group-containing compound with at least one EDG introduced into its N-position and a lithium salt is used as an electrolyte component, can ensure the safety of the battery and simultaneously improve the reduction stability of the electrolyte itself.

Also, the inventive electrolyte comprising such an eutectic mixture can be used in combination with an anode with a reduction potential vs. lithium potential of 1.0V or less, in particular, 0.5V or less.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrolyte for a secondary battery, comprising a mixture consisting of:
    (a) an amide group-containing compound with at least one electron donating group (EDG) introduced into the N-position thereof; and
    (b) an ionizable lithium salt;
    wherein the amide group-containing compound is selected from the group consisting of N-ethylacetamide, ethyl N-methylcarbamate, ethyl N-ethylcarbamate, ethyl N,N-dimethylcarbamate, methyl N-methylcarbamate, methyl N,N-dimethylcarbamate, phenyl N,N-dimethylcarbamate, methyl N-butylcarbamate, methyl N-phenylcarbamate, methyl N-ethylcarbamate, and N-ethyl-N-phenylethylcarbamate; and
    wherein the electrolyte excludes organic solvent selected from the group consisting of toluene, acetone, acetonitrile, tetrahydrofuran (THF), propylene carbonate (PC), ethylene carbonate (EC), diethyl carbonate (DEC), dimethyl carbonate (DMC), dipropyl carbonate (DPC), dimethyl sulfoxide, dimethoxyethane, diethoxyethane, N-methyl-2-pyrrolidone (NMP), ethyl methyl carbonate (EMC), gamma-butyrolactone (GBL) and a mixture thereof.

2. The electrolyte of claim 1, wherein the EDG has a Hammett substituent constant value less than 0.

3. The electrolyte of claim 1, wherein an anion of the lithium salt is selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^{31}$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

4. The electrolyte of claim 1, further comprising:
    (a) a first compound capable of being reduced at a potential higher than a reduction potential vs. lithium potential (Li/Li$^+$) of the mixture to thereby form a passivation film; or
    (b) a second compound having an oxidation potential higher than a cathode potential and thus consuming overcharge current; or
    (c) both the first and second compounds.

5. The electrolyte of claim 1, wherein the electrolyte is a liquid electrolyte.

6. The electrolyte of claim 1, wherein the electrolyte is a gel polymer electrolyte.

7. The electrolyte of claim 6, wherein the electrolyte is formed by polymerizing an electrolyte precursor solution containing: (i) the mixture; and (ii) monomers capable of forming a gel polymer via polymerization.

8. The electrolyte of claim 6, wherein the electrolyte is prepared by impregnating a polymer or a gel polymer with the mixture.

9. The electrolyte of claim 6, wherein the electrolyte is prepared by dissolving a polymer and the mixture in a solvent, and then removing the solvent.

10. A secondary battery comprising:
    a cathode;
    an anode;
    a separator; and
    the electrolyte of claim 1.

11. The secondary battery of claim 10, wherein the anode has a reduction potential vs. lithium potential of 0 to 1V.

12. The secondary battery of claim 10, wherein the anode is selected from the group consisting of a carbonaceous material, a metal, a metalloid, and a metalloid-containing alloy.

13. The secondary battery of claim 10, wherein the secondary battery has a charge/discharge voltage ranging up to 4.35V.

14. The secondary battery of claim 10, wherein the electrolyte further comprises:
    (a) a first compound capable of being reduced at a potential higher than a reduction potential vs. lithium potential (Li/Li$^+$) of the mixture to thereby form a passivation film; or
    (b) a second compound having an oxidation potential higher than a cathode potential and thus consuming overcharge current; or
    (c) both the first and second compounds.

15. An electrolyte for a secondary battery, comprising a mixture consisting of:
    (a) an amide group-containing compound with at least one electron donating group (EDG) introduced into the N-position thereof; and
    (b) an ionizable lithium salt;
    wherein:
    (i) the molar ratio of the amide group-containing compound to the lithium salt is from 1:1 to 8:1;
    (ii) the amide group-containing compound is selected from the group consisting of N-ethylacetamide, ethyl N-methylcarbamate, ethyl N-ethylcarbamate, ethyl N,N-dimethylcarbamate, methyl N-methylcarbamate, methyl N,N-dimethylcarbamate, phenyl N,N-dimethylcarbamate, methyl N-butylcarbamate, methyl N-phenylcarbamate, methyl N-ethylcarbamate, and N-ethyl-N-phenylethylcarbamate; and
    (iii) the electrolyte excludes organic solvent selected from the group consisting of toluene, acetone, acetonitrile, tetrahydrofuran (THF), propylene carbonate (PC), ethylene carbonate (EC), diethyl carbonate (DEC), dimethyl carbonate (DMC), dipropyl carbonate (DPC), dimethyl sulfoxide, dimethoxyethane, diethoxyethane, N-methyl-2-pyrrolidone (NMP), ethyl methyl carbonate (EMC), gamma-butyrolactone (GBL) and a mixture thereof.

16. A secondary battery comprising:
    a cathode;
    an anode;
    a separator; and
    the electrolyte of claim 15.

* * * * *

UNITED STATES PATENT AND TRADEMARK OFFICE
CERTIFICATE OF CORRECTION

| | | |
|---|---|---|
| PATENT NO. | : 8,808,924 B2 | Page 1 of 1 |
| APPLICATION NO. | : 12/523092 | |
| DATED | : August 19, 2014 | |
| INVENTOR(S) | : Byoung-Bae Lee et al. | |

It is certified that error appears in the above-identified patent and that said Letters Patent is hereby corrected as shown below:

On the title page, item 75

Inventors: "Cheonan-si" should read --Chungcheongnam-do--;

Inventors: "Iksan-si" should read --Jeollabuk-do--.

In the claims

Column 13, line 50, "$CF_3CF_2SO_3^{31}$" should read --$CF_3CF_2SO_3^-$--.

Signed and Sealed this
Twenty-ninth Day of March, 2016

Michelle K. Lee
*Director of the United States Patent and Trademark Office*